US007195377B2

(12) United States Patent
Tsai

(10) Patent No.: US 7,195,377 B2
(45) Date of Patent: Mar. 27, 2007

(54) WORKLIGHT SUPPORT WITH STAND

(76) Inventor: Peter Tsai, 9F, No. 126, Yu-Ming 6th Rd., Taipei (TW)

( * ) Notice: Subject to any disclaimer, the term of this patent is extended or adjusted under 35 U.S.C. 154(b) by 140 days.

(21) Appl. No.: 11/149,595

(22) Filed: Jun. 9, 2005

(65) Prior Publication Data
US 2006/0291961 A1  Dec. 28, 2006

(51) Int. Cl.
F21S 8/00 (2006.01)
F21S 13/10 (2006.01)
(52) U.S. Cl. .................. 362/431; 362/419; 362/427
(58) Field of Classification Search .............. 362/431
See application file for complete search history.

(56) References Cited
U.S. PATENT DOCUMENTS
4,744,690 A * 5/1988 Hsieh .................. 403/104
5,060,894 A * 10/1991 Hillinger ............... 248/170
5,934,628 A * 8/1999 Bosnakovic ........... 248/177.1
6,474,844 B1 * 11/2002 Ching .................. 362/285
2003/0174503 A1 * 9/2003 Yueh .................... 362/413

* cited by examiner

Primary Examiner—Sandra O'Shea
Assistant Examiner—Jason Moon Han
(74) Attorney, Agent, or Firm—patenttm.us; James H. Walters

(57) ABSTRACT

A worklight support includes a platform for mounting thereon worklights and has an extension extending from on a bottom of the platform for extension into one of the stand sections. A stand includes couplers applied for combination of each of the stand sections. Each coupler includes an annular ring for receiving therein a portion of one of the stand sections and a portion of the extension of the worklight support and a pivotal handle pivotally connected to the annular ring via a threaded bolt to selectively reduce an internal diameter of the annular ring to abut an outer periphery of the extension so as to fix the extension relative to one of the stand sections.

4 Claims, 6 Drawing Sheets

WORKLIGHT SUPPORT WITH STAND

BACKGROUND OF THE INVENTION

1. Field of the Invention

The present invention relates to a worklight support with a stand, and more particularly to a worklight support having an extension extending downward therefrom and a stand telescopically connected to the worklight support.

2. Description of Related Art

Worklights are extensively used in night working sites to provide illumination to workers. Normally, a single worklight assembly, as shown in FIG. 6, includes a support (5) for mounting thereon bulbs such as halogen lights and a stand (6) to provide stability to the support (5) on a surface. However, because the area that requires illumination changes a lot according to conditions, the height of the stand (6) changes to cope with the location variations. The conventional structure of the stand (6) includes multiple sections (60) and is telescopically connected together via rotating knobs (61) each provided at a joint of two adjacent sections (60) such that the user is able to use the rotating knobs (61) to fix relative positions of two adjacent stand sections (60) after adjustment. That is, when adjustment of the height of the worklight stand is required, the user will have to unscrew each rotating knob (61) to allow two adjacent stand sections (60) to be freely movable relative to each other and then the rotating knobs (61) are secured to fix the two adjacent stand sections (60) after the height of the worklight stand is adjusted. The loosening and tightening process to adjust the worklight stand is not efficient and is time consuming especially in an emergency situation. Thus improvement to the worklight stand connection is required. Furthermore, the worklight support (5) which is mounted on the worklight stand (6) is based on at least one screw (51) extending through the worklight support (5) and into the worklight stand (60) so as to secure the worklight support (5) on top of the worklight stand (6). Therefore, it is a requirement for the user to unscrew the at least one screw (51) fixing the worklight support (5) on top of the worklight stand (6) when in disassembly thereof, which is quite labor inefficient.

To overcome the shortcomings, the present invention tends to provide an improved worklight support and a stand to mitigate the aforementioned problems.

SUMMARY OF THE INVENTION

The primary objective of the present invention is to provide a worklight support connected to a stand via couplers so that the user is able to readily disassemble the worklight support and the worklight stand.

In one aspect of the present invention, the worklight support has an extension extending downward from a bottom of the worklight support to enter a stand section of the worklight stand. A coupler is applied to the stand section such that after the extension is extended into the stand section, the coupler is able to secure the extension in the stand section.

In another aspect of the present invention, the worklight stand has multiple stand sections telescopically connected together via couplers. That is, each stand section on top of an adjacent stand section has a diameter smaller than a diameter of the adjacent stand section so that the top stand section is able to extend into the stand section below.

A further aspect of the present invention is that each stand section has an annular ring with a gap defined therein, two wings respectively extending from two opposed sides defining the gap to allow a threaded bolt to extend therethrough and a pivotal handle pivotally connected to the threaded bolt such that pivotal movement of the handle is able to narrow a diameter of the annular ring. Therefore, after the extension is extended and received in one of the stand section, the handle is able to secure the position of the extension relative to the corresponding stand section.

Other objects, advantages and novel features of the invention will become more apparent from the following detailed description when taken in conjunction with the accompanying drawings.

DETAILED DESCRIPTION OF THE PREFERRED EMBODIMENT

Figure 1:
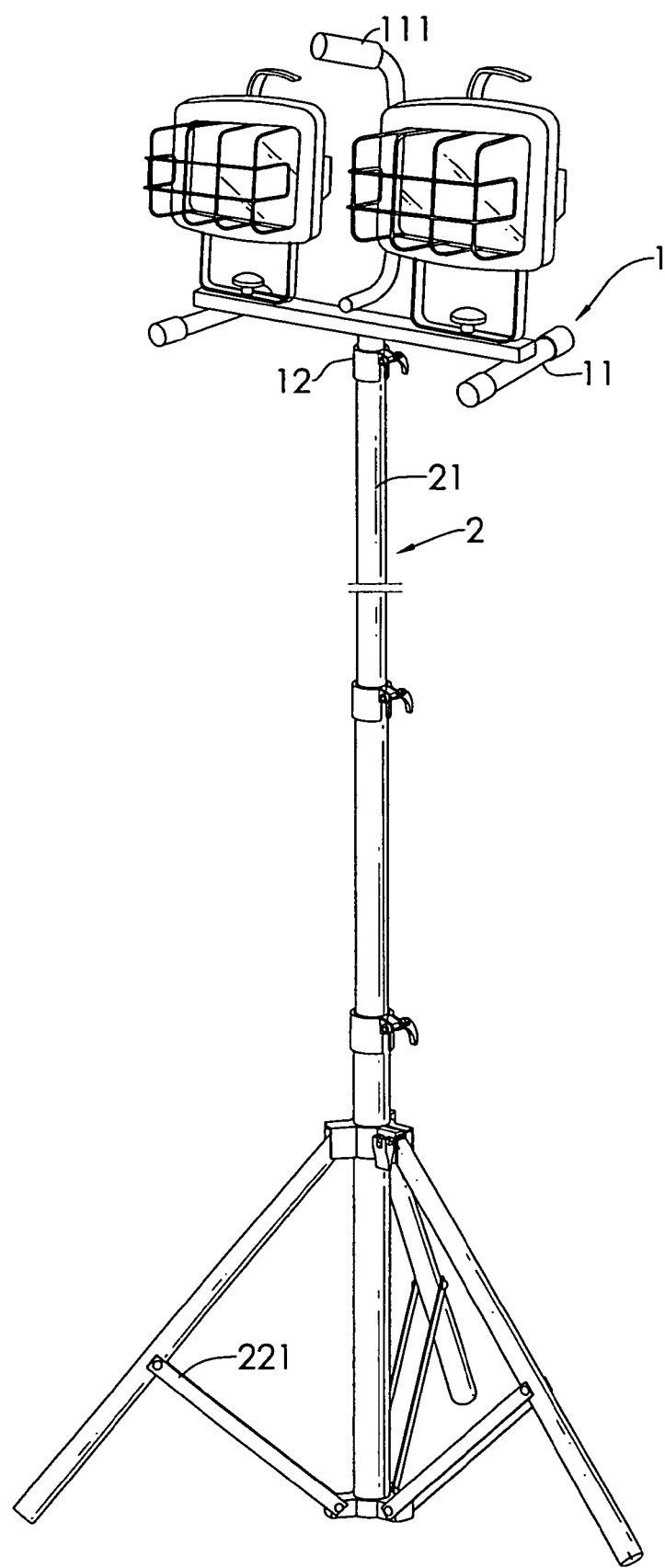
FIG. 1 is a perspective view of the worklight support and the worklight stand of the present invention.

With reference to FIG. 1, it is noted that the worklight support (1) and the stand (2) of the present invention are shown. The worklight support (1) constructed in accordance with the present invention includes a platform (11) for mounting thereon worklights. The platform (11) has a handle (111) mounted thereon for easy transportation of the worklight support (1) and an extension (12) extending from a bottom face of the platform (11). The worklights shown on top of the platform (11) are for illustrative purpose only and not intended to limit the scope of the invention. The scope of the present invention should be determined by the claims.

Figure 2:
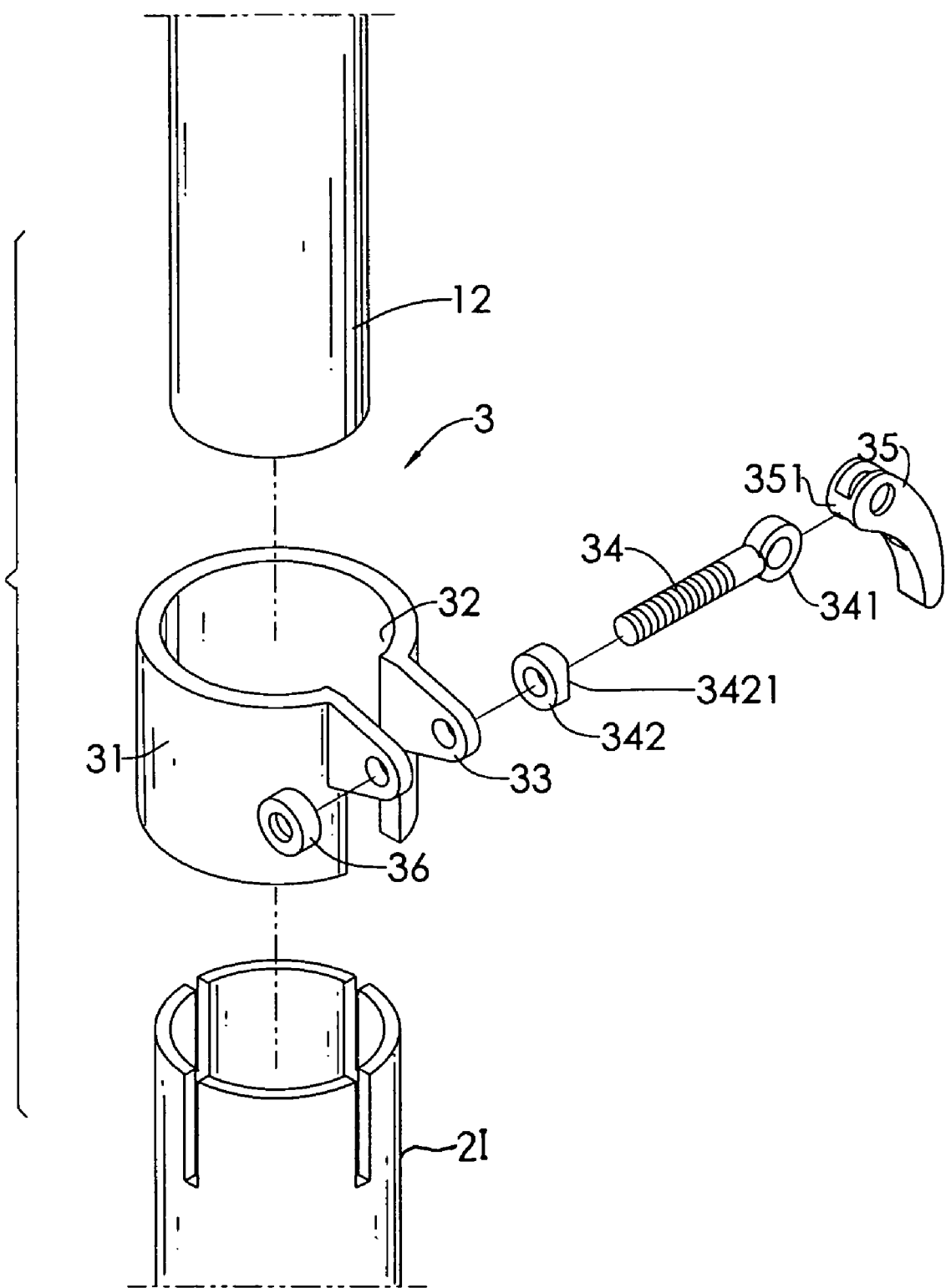
FIG. 2 is an exploded perspective view of a coupler used to secure to adjacent stand sections of the worklight stand.
Figure 3:
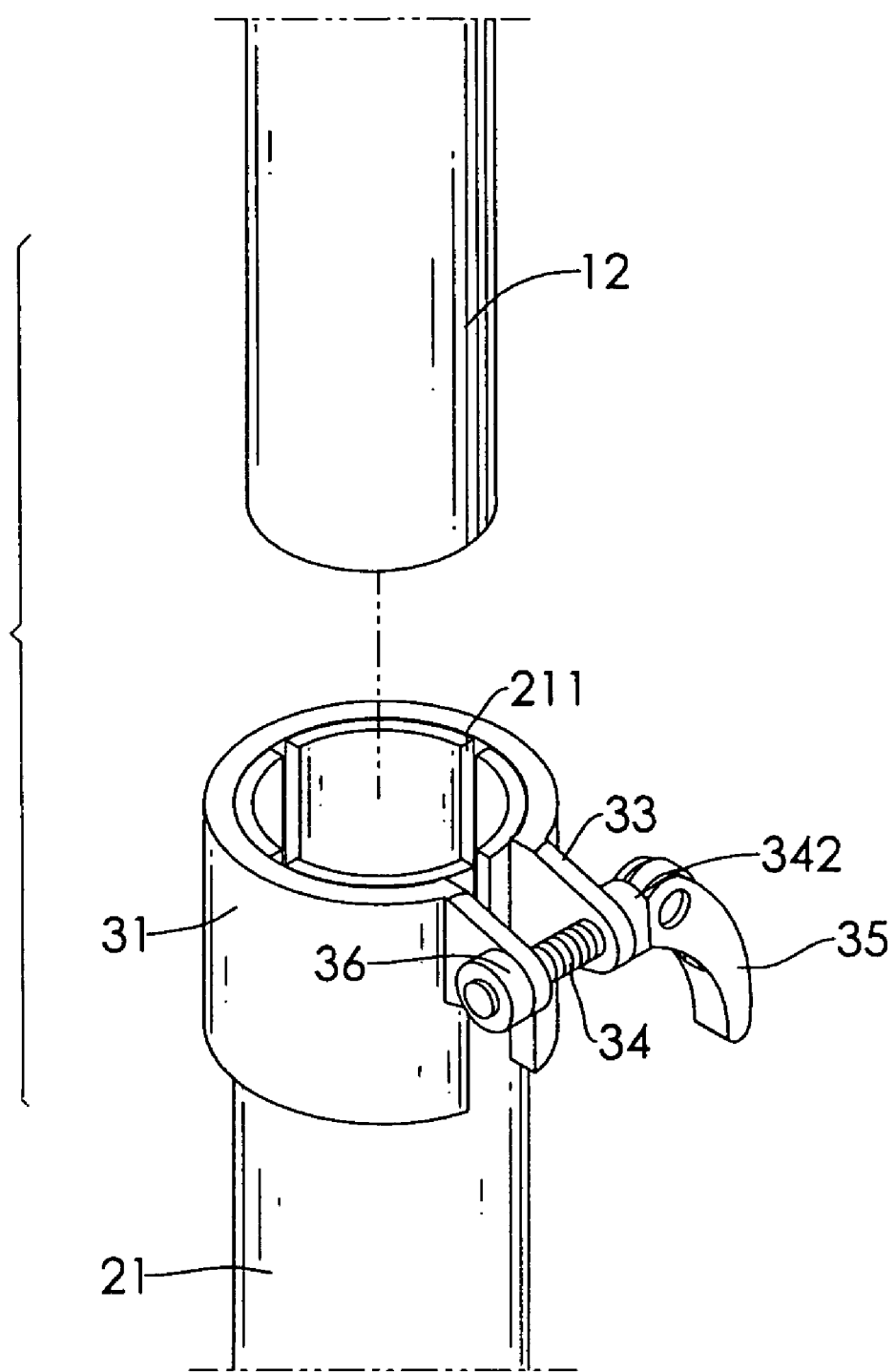
FIG. 3 is an exploded perspective view showing that the coupler is mounted on one of the stand sections.

With reference to FIGS. 2 and 3, it is noted that a coupler (3) is used to secure two adjacent stand sections of the worklight stand (2). Because telescopic sections interconnecting together are conventional in the art, the following description will not be discussing the structure of the telescopic sections of the worklight stand (2) but how they are secured together via couplers.

From the depiction of FIG. 1, it is noted that the worklight stand (2) includes multiple stand sections (21) respectively interconnecting together and on top of each other. Each of the stand sections (21) is hollow. The stand section (21) on top of the other stand section (21) is extendable into the stand section (21) below. Furthermore, the extension (12) of the platform (11) has a diameter smaller than the internal diameter of the stand section (21) connecting to the extension (12) so that the extension (12) is able to extend into the stand section (21). The coupler (3) includes an annular ring (31), a gap (32) defined in the annular ring (31), two wings (33) respectively formed on two opposed sides defining the gap (32), a threaded bolt (34) extending through the two wings (33) and a pivotal handle (35). The annular ring (31) is constructed to accommodate one of the stand sections (21)

as well as the extension (12). The threaded bolt (34) has a head (341) formed on an end of the threaded bolt (34) and a cushion (342) sandwiched between the head (341) and a side face of one of the wings (33) and having an arcuate face (3421) to correspond and abut to the head (341). The pivotal handle (35) has an oval-shaped abutting head (351) formed on the pivotal handle (35) to correspond and abut to the head (341) of the threaded bolt (34).

With special reference to FIG. 3, when the coupler (3) of the present invention is assembled, the annular ring (31) is first mounted on top of the stand section (21) to receive therein a portion of the stand section (21). Then a stop (36) is applied to the threaded bolt (34) after passing the two wings (33) to prevent disengagement of the threaded bolt (34) from the two wings (33). Thereafter, the extension (12) is extended into the hollow stand section (21) and the pivotal handle (35) is pivoted.

Figure 4A:
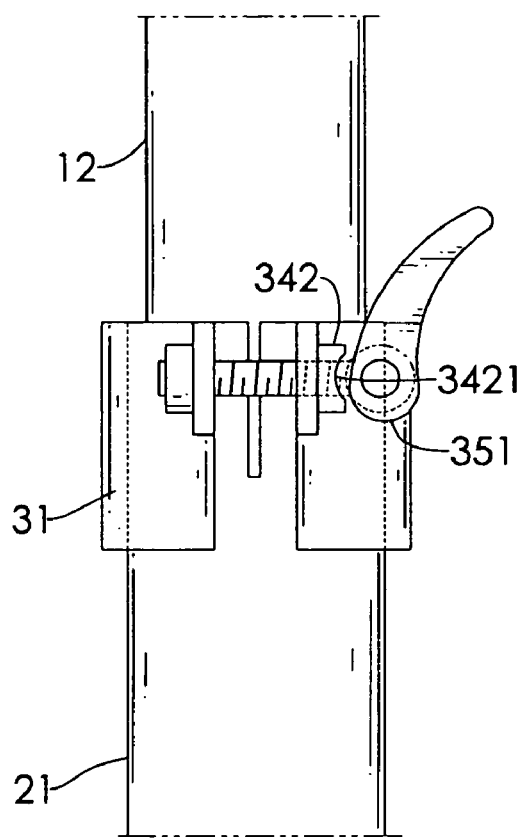
FIGS. 4A and 4B are schematic cross sectional views showing the application of the coupler to secure two adjacent stand sections.
Figure 4B:
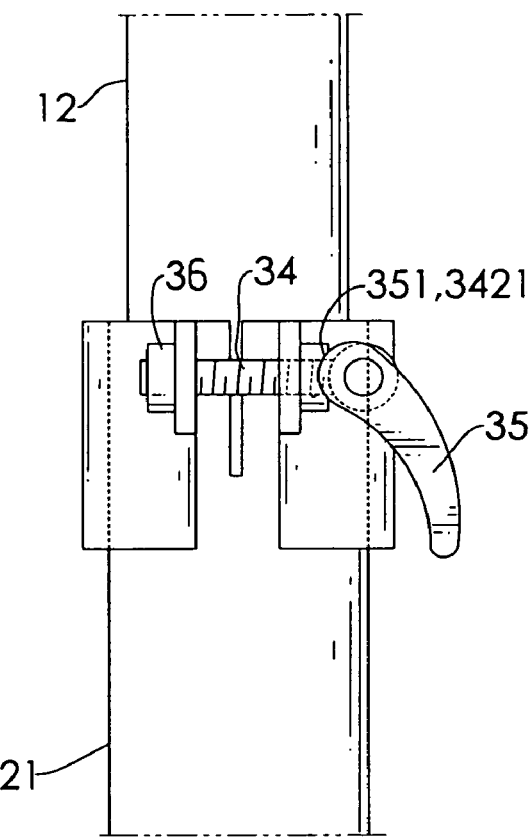

With reference to FIGS. 4A and 4B, after the extension (12) is extended into the stand section (21), the user is able to hold and move the pivotal handle (35) to allow the oval-shaped abutting head (351) to abut the head (341) of the threaded bolt (34). However, due to the provision of the stop (36) to the end of the threaded bolt (34), the abutment between the head (341) and the oval-shaped abutting head (351) forces one of the wings (33) to move closer to the other wing (33), which reduces the internal diameter of the stand section (21) such that if the extension (12) is received in this stand section (21), the reduction of the internal diameter of this stand section (21) is able to secure the position of the extension (12). Thereafter, the user is able to easily adjust height of the worklight support (1) relative to the stand section (21). Also, the user is able to readily disassemble the worklight support (1) from the worklight stand (2).

From the depiction of the drawings, it is noted that the couplers (3) of the present invention are also applied to combine the stand sections (21).

As previously indicated, the structure of each of the stand sections (21) will not be discussed. To understand how the coupler (3) is applied to combine two adjacent stand sections (21), the only thing needs to be done is to replace the extension (12) with a stand section (21) extendable into a stand section (21) below.

Figure 5:
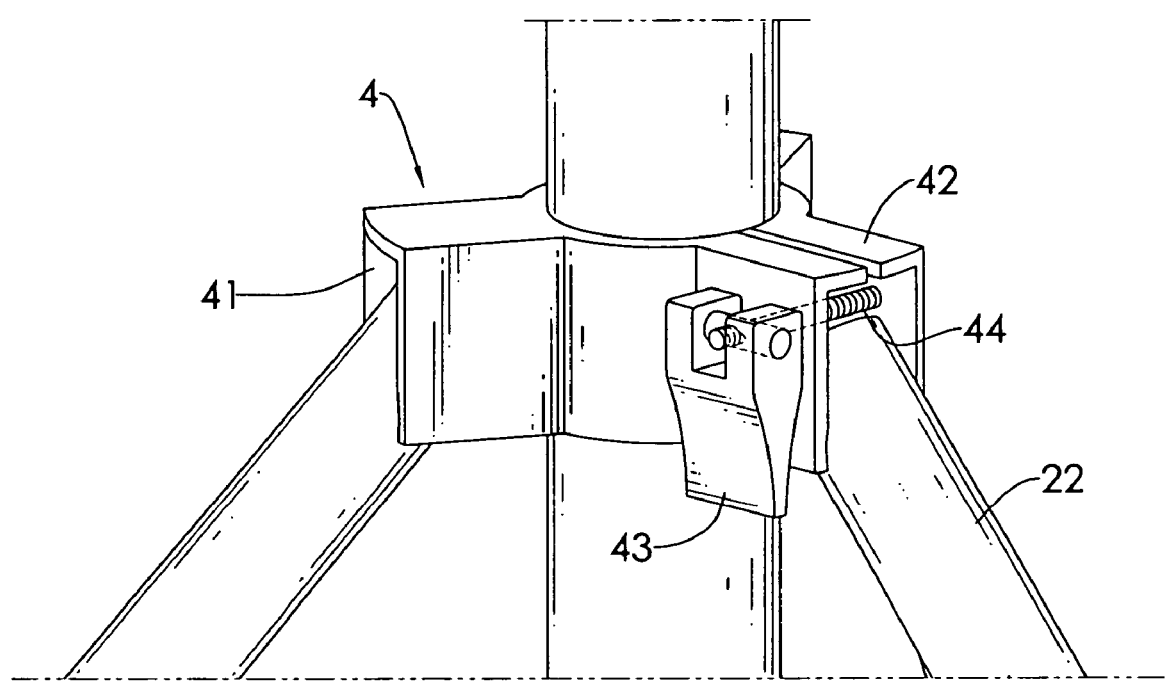
FIG. 5 is an enlarged perspective view showing the application of a bottom coupler to secure legs of the worklight stand.
Figure 6:
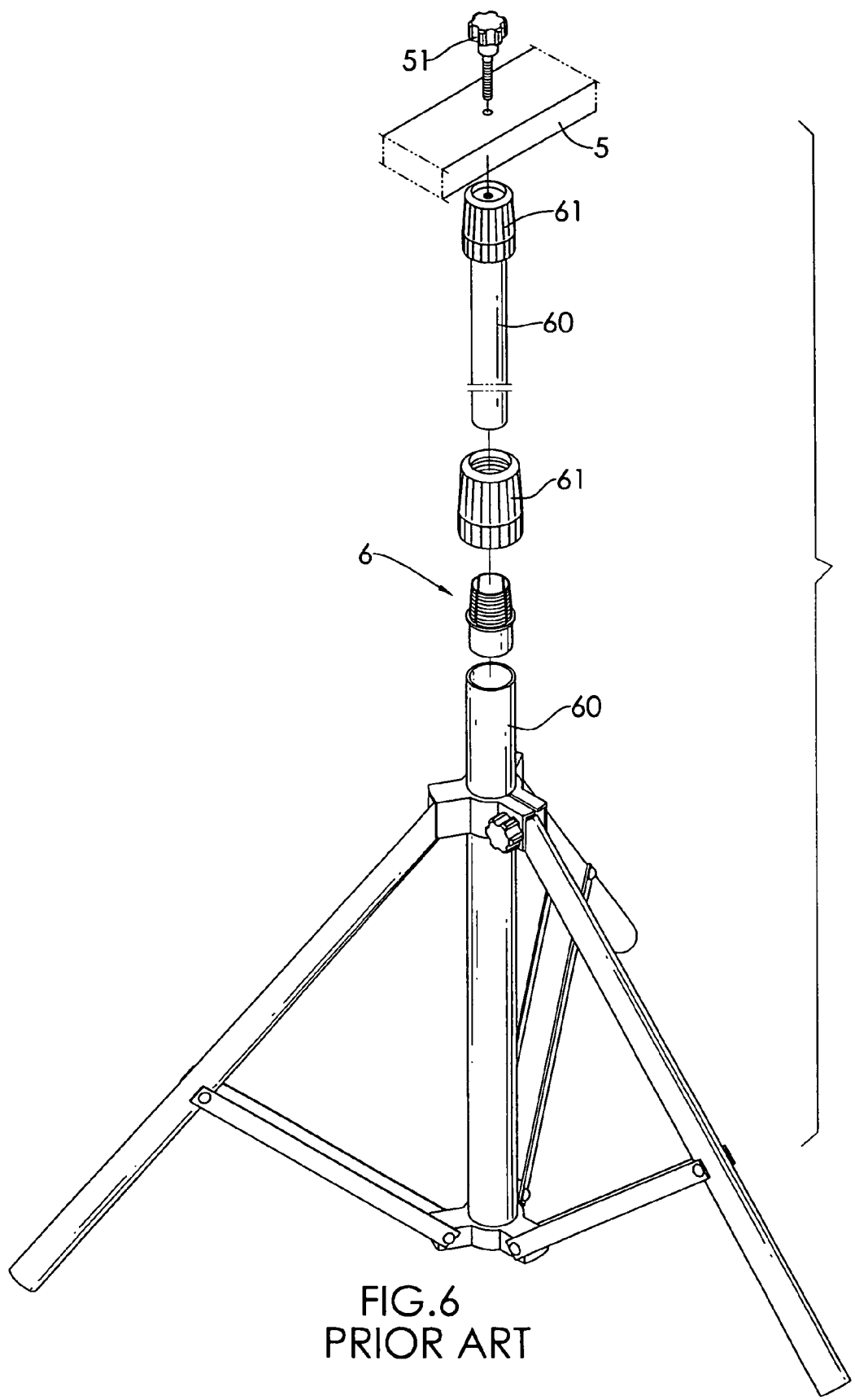
FIG. 6 is a perspective view of a conventional worklight support, wherein a portion of the worklight support is exploded for illustration.

With reference to FIG. 5 and still using FIG. 1 for reference, it is noted that the worklight stand (2) of the present invention further has multiple supporting legs (22) divergently and pivotally connected to one of the stand sections (21) so as to support the worklight stand (2) on top of a surface. Each supporting leg (22) is pivotally connected to the stand section (21) via a connector (4) and has a rib (221) pivotally connecting the corresponding supporting leg (22) and the stand section (21).

In this embodiment, the connector (4) has two cutouts (41) to pivotally receive therein two supporting legs (22) respectively and a clamp (42) composed of two halves. A securing device is applied to securely engage with the outer periphery of the stand section (21) and to secure the two halves of the clamp (42) and includes a control handle (43) and a bolt (44) extending between the two halves of the clamp (42) to allow the control handle (43) to pivotally connect to the bolt (44) such that the user is able to hold the control handle (43) to allow the two halves of the clamp (42) to securely sandwich the supporting leg (22) receiving between the two halves of the clamp (42). Therefore, the supporting legs (22) are not foldable if the two halves of the clamp (42) are securely clamped by control handle (43). However, when the two halves of the clamp (42) are released by the control handle (43), the supporting legs (22) are able to be folded.

With the extension (12) formed on the bottom face of the worklight and the application of the couplers (3), the adjustment and assembly/disassembly of the worklight become easy and fast.

Furthermore, the application of the clamp (4) to control the retraction of the legs (22) of the worklight stand (2) facilitates the installation of the worklight stand (2) of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A worklight support with a stand having multiple stand sections telescopically interconnecting together,
the worklight support comprising:
a platform provided on top of the stand for mounting thereon worklights and having an extension formed on a bottom of the platform for extension into one of the stand sections;
the stand comprising:
couplers applied for combination of each of the stand sections and each coupler including an annular ring for receiving therein a portion of one of the stand sections and a portion of the extension of the worklight support, the annular ring having a gap defined therein, two wings respectively extending from two opposed sides defining the gap to allow a threaded bolt to extend therethrough and a pivotal handle pivotally connected to the threaded bolt such that pivotal movement of the pivotal handle is able to narrow an internal diameter of the annular ring so as to fix the extension in the stand section, wherein the stand further has multiple supporting legs pivotally connected to an outer periphery of one of the stand sections and each supporting leg having a rib pivotally connecting the supporting leg and the outer periphery of one of the stand sections, a securing device engageable with one of the stand sections is provided to secure pivotal movement of the supporting legs and has a connector having multiple cutouts to respectively and pivotally receive therein the supporting legs and a clamp composed of two halves for pivotally receiving therein one of the supporting legs,
wherein a stop having an arcuate face for abutment to a head formed on an end of the threaded bolt is sandwiched between a side face of one of the wings and the head of the threaded bolt, the pivotal handle has an oval-shaped abutting head formed to abut the head of the threaded bolt such that the pivotal movement of the pivotal handle is able to reduce the internal diameter of the annular ring so as to fix the extension.

2. The worklight support as claimed in claim 1, wherein the platform further has a handle formed thereon for easy transportation of the worklight support.

3. The worklight support as claimed in claim 1, wherein the securing device further has a bolt extending through the two halves of the clamp and a control handle pivotally connected to the clamp to selectively and securely sandwich the supporting leg received between the two halves of the clamp.

4. The worklight support as claimed in claim 2, wherein the securing device further has a bolt extending through the two halves of the clamp and a control handle pivotally connected to the clamp to selectively and securely sandwich the supporting leg received between the two halves of the clamp.

\* \* \* \* \*